United States Patent

Lang

(10) Patent No.: US 11,033,838 B2
(45) Date of Patent: Jun. 15, 2021

(54) FILTER ELEMENT

(71) Applicant: Hydac Filtertechnik GmbH, Sulzbach/Saar (DE)

(72) Inventor: Timo Lang, Neunkirchen (DE)

(73) Assignee: HYDAC FILTERTECHNIK GMBH, Sulzback/Saar (DE)

( * ) Notice: Subject to any disclaimer, the term of this patent is extended or adjusted under 35 U.S.C. 154(b) by 113 days.

(21) Appl. No.: 14/418,154

(22) PCT Filed: Dec. 24, 2012

(86) PCT No.: PCT/EP2012/005375
§ 371 (c)(1),
(2) Date: Jan. 29, 2015

(87) PCT Pub. No.: WO2014/075702
PCT Pub. Date: May 22, 2014

(65) Prior Publication Data
US 2015/0165352 A1 Jun. 18, 2015

(30) Foreign Application Priority Data

Nov. 14, 2012 (DE) ...................... 10 2012 022 283.1
Nov. 14, 2012 (DE) ...................... 10 2012 022 285.8

(51) Int. Cl.
*B01D 29/21* (2006.01)
*B01D 29/33* (2006.01)
*B01D 29/56* (2006.01)

(52) U.S. Cl.
CPC ........... *B01D 29/21* (2013.01); *B01D 29/333* (2013.01); *B01D 29/56* (2013.01); *B01D 2201/122* (2013.01)

(58) Field of Classification Search
CPC .................. B01D 29/333; B01D 29/21; B01D 2201/122; B01D 46/521; B01D 29/56
USPC .................................. 210/232, 497, 435, 437
See application file for complete search history.

(56) References Cited

U.S. PATENT DOCUMENTS

| | | | | |
|---|---|---|---|---|
| 2,395,449 A | * | 2/1946 | Briggs | ............... B01D 29/111 210/489 |
| 2007/0278149 A1 | * | 12/2007 | Kuwabara | ............ B01D 29/21 210/493.2 |
| 2010/0089819 A1 | * | 4/2010 | Hamlin | ................. B01D 29/21 210/490 |

(Continued)

FOREIGN PATENT DOCUMENTS

| | | |
|---|---|---|
| DE | 20 2009 000 969 U1 | 7/2010 |
| EP | 1 757 355 A1 | 2/2007 |
| FR | 2791579 A1 * 10/2000 | ........... B01D 29/111 |

(Continued)

*Primary Examiner* — Waqaas Ali
(74) *Attorney, Agent, or Firm* — Wenderoth, Lind & Ponack, L.L.P.

(57) ABSTRACT

A filter element (1), with a preferably multilayer structure of a filter medium (3), in pleated form has filter pleats (5, 7) of different pleat heights (h1, h2). The filter pleats (7) with a first pleat height (h1) oppose the filter pleats (5) lower second pleat height (h2). The filter element has a through-flow direction for fluid to be cleaned away from a dirty side to a clean side (R). The transitions arranged adjacent to the inner side all conclude along a fictitious circular cylinder (9), which penetrates the filter medium (3) coaxially to its longitudinal axis (LA).

8 Claims, 2 Drawing Sheets

(56) References Cited

U.S. PATENT DOCUMENTS

2010/0243554 A1\* 9/2010 Herrin .................... B01D 29/21
                                                                210/457
2010/0247404 A1\* 9/2010 Ptak ....................... B01D 46/10
                                                                422/187

FOREIGN PATENT DOCUMENTS

| GB | 725066 A | \* | 3/1955 | ............ B01D 29/21 |
| JP | 07243356 A | \* | 9/1995 | |
| JP | H07 243356 A | | 9/1995 | |
| WO | WO 2004/041407 A1 | | 5/2004 | |
| WO | WO-2004041407 A1 | \* | 5/2004 | ............ B01D 29/21 |
| WO | WO 2010/111411 A1 | | 9/2010 | |

\* cited by examiner

FILTER ELEMENT

FIELD OF THE INVENTION

The invention relates to a filter element having a filter medium with a preferably multilayer structure. The filter element includes, in pleated form, filter pleats of different pleat heights, with filter pleats having a first filter pleat height and with filter pleats having a comparatively lower second pleat height. The filter element includes a flow-through direction for fluid to be cleaned from a dirty side to a clean side.

BACKGROUND OF THE INVENTION

Filter elements of this type are customary in the trade. Such filter elements, in combination with fluid systems of various types, are widely used for filtering process fluids, pressurized fluids, such as hydraulic oils, as well as liquid fuels and lubricants for conditioning fluid media and the like. In many cases, there is only a limited amount of useable space in fluid systems, in which the filter elements are used, for installing or removing the system parts that contain the relevant candle filter-like filter elements. On the other hand, a filter surface provided by the filter element of sufficient size is required to be able to filter correspondingly large filter currents.

To provide a sufficiently large filter surface, the known filter elements, as these are readily obtainable on the market, have a filter medium typically composed of multiple layers of different filter materials folded or pleated in a zig-zag shape. During manufacture, the filter medium is guided through a cutting device, in which the filter medium is cut to size at the edge before it is conveyed further to a pleating machine, in which the zig-zag shape or the pleating is formed. In the further course of manufacture, the tailored filter medium is separated into sections shaped to form a tubular body and, in that respect, form the filter element.

SUMMARY OF THE INVENTION

An object of the invention is to provide an improved filter element, which, even after a longer service life, exhibits a high filter performance at a low flow-through velocity.

This object is basically achieved by a filter element having the transitions of all filter pleats situated adjacent to the clean side or to the dirty side end along a fictitious circular cylinder, which cylinder extends through the filter medium coaxially to its longitudinal axis.

As a result of the configuration according to the invention of filter pleats of the first pleat height and of the second pleat height, stabilization occurs. The filter pleats of the second pleat height support the filter pleats of the first pleat height. Thus, a pressure-resistant structure for the filter element is achieved via the filter pleats of varying characteristic heights. Moreover, the filter pleats of the first pleat height are maintained in their original configuration during the operation of the filter element, and have a particularly large surface area facing the dirty side. The open surface area facing the dirty side is therefore larger than in the case of conventional filter elements having a uniform pleat height over the entire circumference. This arrangement facilitates the fluid penetration of the filter medium and results in a filter element having an improved filter performance over its lifetime, in addition to a longer service life.

In standard filter element solutions, the filter pleats regularly have the same insertion height, which, depending on the flow conditions, may mean that multiple filter pleats situated adjacent to one another may come into direct contact with one another along their effective filter surface. This contact may lead to a type of "interlocking" of the element material in this connecting region. The medium to be filtered can then no longer reach all of the filter pleats of the element composite undisturbed. Due to the inserted filter pleats having the second lower pleat height, the first filter pleats are maintained securely in their position, independently of the flow-through situation, and are able in this way to effectively ensure the filtration of particle contaminants from the fluid over the entire duration of use of the filter element. This filtration is not possible with conventional elements.

The filter pleats having the first pleat height and the filter pleats having the second pleat height are advantageously situated largely alternatingly relative to one another. The alternating or varying configuration stabilizes particularly effectively the pleat geometry of the filter pleats of the first pleat height. In the case of an alternating configuration, more filter pleats of the first pleat height can freely project above filter pleats of the second pleat height, such that the surface area of the filter pleats of the first pleat height exposed to the dirty side or the clean side is maximized.

With the filter pleats having the second filter pleat height, the orientation and/or configuration of the filter pleats having the first pleat height can be stabilized. The filter pleats of the second pleat height therefore serve as support pleats. This stabilization has an advantageous effect over the service life of the filter element. As a result of the stabilization of the shape of the filter pleats, the filtration performance is then significantly improved over time.

A contacting or adherence of the filter pleats of the first pleat height to one another is particularly advantageously prevented by the filter pleats having the second pleat height, insofar as the filter pleats having the first pleat height project toward the dirty side or the clean side over those having the second pleat height. The contacting or adherence of filter pleats to one another consistently results in an undesirable reduction of the effective filter surface. This undesirable reduction is now effectively prevented by the configuration according to the invention, since the filter pleats of the first pleat height are spaced apart from one another.

The effective filter surface of the filter medium, in spite of the reduction in filter surface area, is the advantageously same and is preferably increased, as compared to a filter medium having filter pleats of uniform height comparable to the first pleat height. Consequently, with the same effective filter surface, the amount of filter medium can be reduced, while maintaining the effective filter surface in spite of the reduction in the surface area of the filter medium. Both approaches result in a significantly improved filter element, in which the filter medium is optimally utilized.

The clean side is advantageously situated on the inside of the filter element, which, in forming the fictitious circular cylinder, is encompassed by the filter medium. In this way, the filter medium is advantageously perfused from the outside to the inside during the filtration.

Alternatively, the clean side can be situated on an outer side of the filter medium, which outer side faces away from the fictitious circular cylinder. Thus, the filter medium is perfused from the inside toward the outside. This configuration has the advantage that the density of the filter medium may be significantly increased.

The respective filter pleat is advantageously formed from two planar filter surfaces lying against one another which, connected, form the pleated filter medium, and which have the same bend radius in the region of the transition to the respective adjacently situated filter pleat. The arcuate transitions protect the filter medium during pleating. In addition, the planar filter surfaces are ensured to be spaced apart from one another. In this way, the effective filter surface is also advantageously increased.

The filter pleats are advantageously supported toward one side by a support tube, by which the fictitious circular cylinder is formed. The support tube provides a contact surface for the filter pleats. Hence, their shape is further stabilized, which is of particular advantage in the case of severely fluctuating or pulsating fluid currents.

In addition, the filter pleats having the second pleat height may take up ¼ to ¾, preferably approximately ⅔ the height of the filter pleats having the first pleat height. Tests were able to ascertain an optimal stabilization and support effect of the filter pleats, with simultaneous optimization of the effective filter surface for this range.

Particularly advantageously, the filter pleats having the second pleat height are bounded in each case by an adjacent filter pleat having the first pleat height and form a type of M-pleat configuration M, as seen in an axial top view of the filter medium and from the clean side.

The individual filter pleats of differing pleat heights advantageously split conically apart, forming the M-pleat configuration for obtaining slit-shaped fine filtration regions at the base of the filter medium situated on the clean side.

Due to the M-pleat configuration between two adjacent filter pleats of the first pleat height, which bound a filter pleat of the second pleat height, an open holding space for fluid is advantageously formed on the dirty side or the clean side in the manner of a fictitious cylindrical segment. During operation of the filter element, this configuration results in a standardization and, preferably, to a reduction of the flow velocity of the fluid through the filter element. Thus, fluid may be temporarily stored or accumulate in the open holding space, to then flow evenly through the filter medium. This flow improves the filtration performance and avoids an excessive charging of fluid due to an excessively high flow velocity.

During operation of the filter element, in which the filter element is normally perfused by a fluid contaminated with particles, and is electrostatically charged, particularly advantageously, due to the M-pleat configuration, this charging is reduced as a result of the reduction of the fluid flow velocity induced by the respective holding space.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
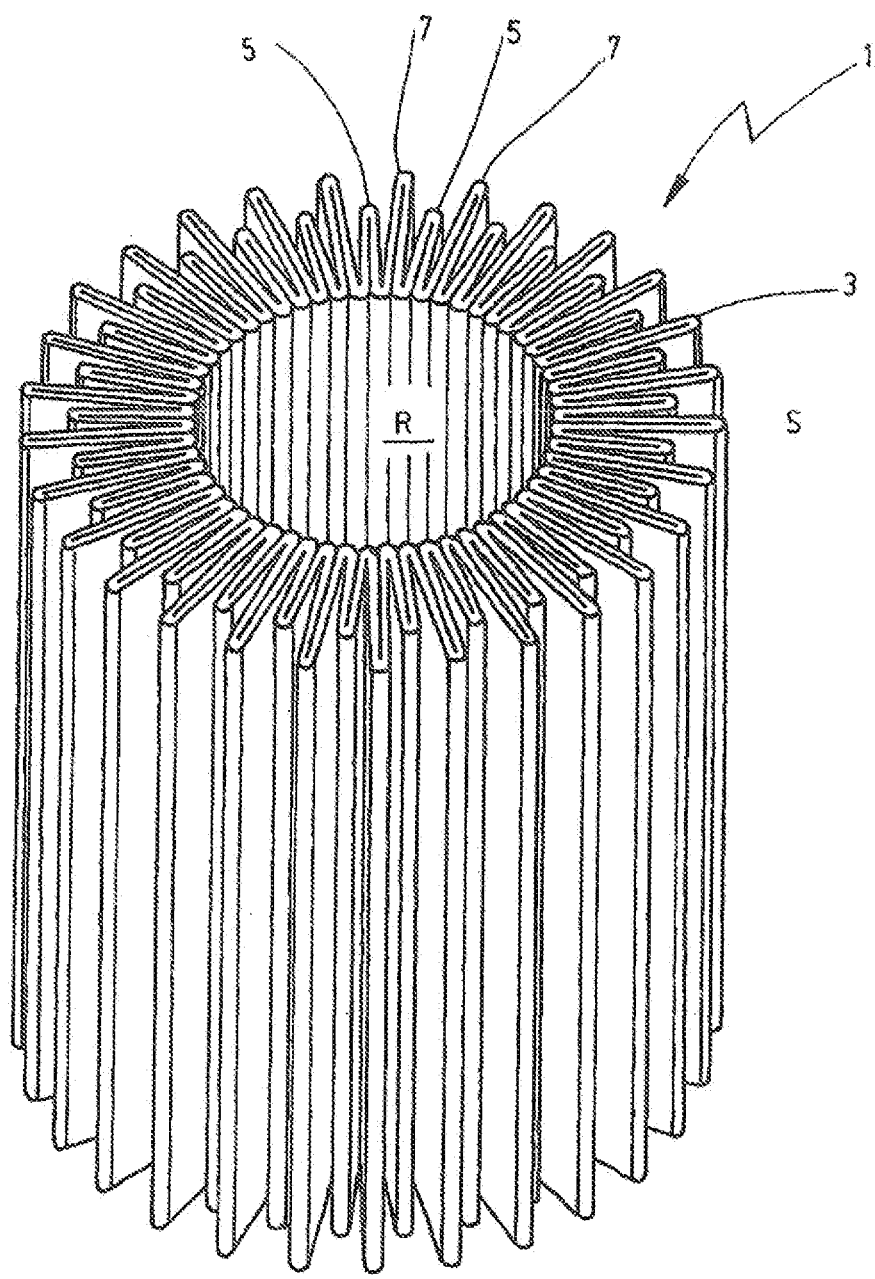
FIG. 1 is a perspective view of a filter medium according to an exemplary embodiment of the invention.
Figure 2:
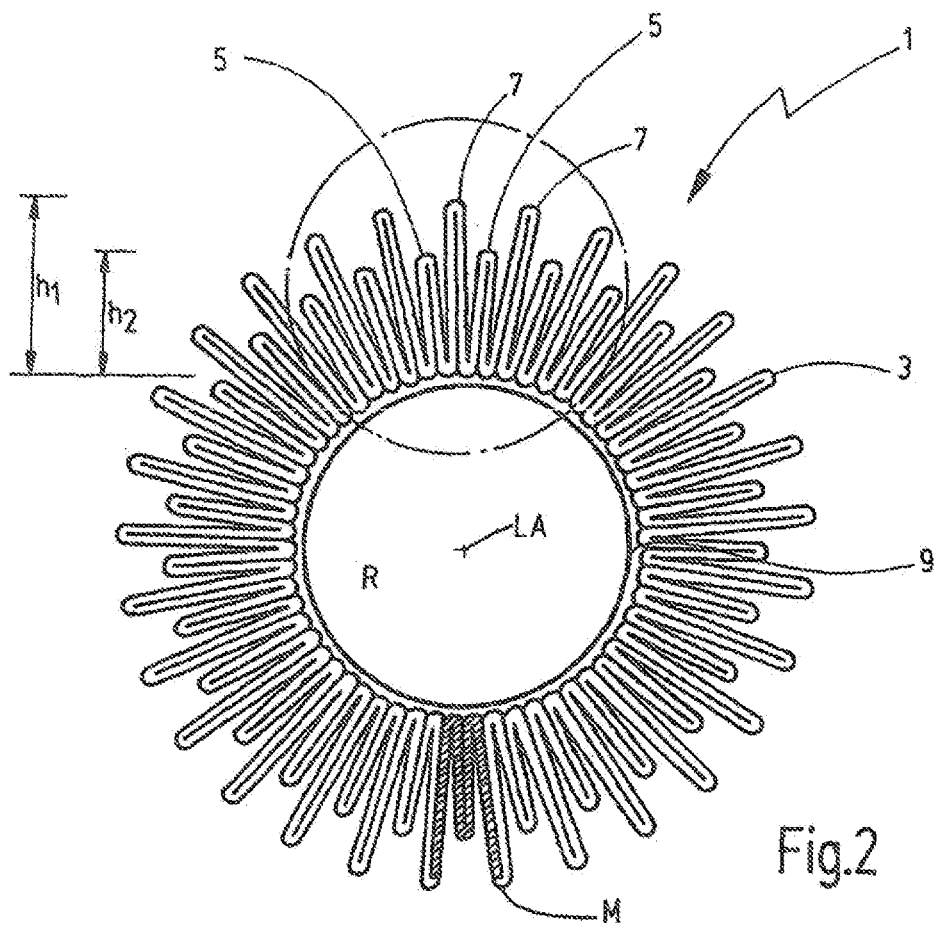
FIG. 2 is a top view of the filter medium of FIG. 1.
Figure 3:
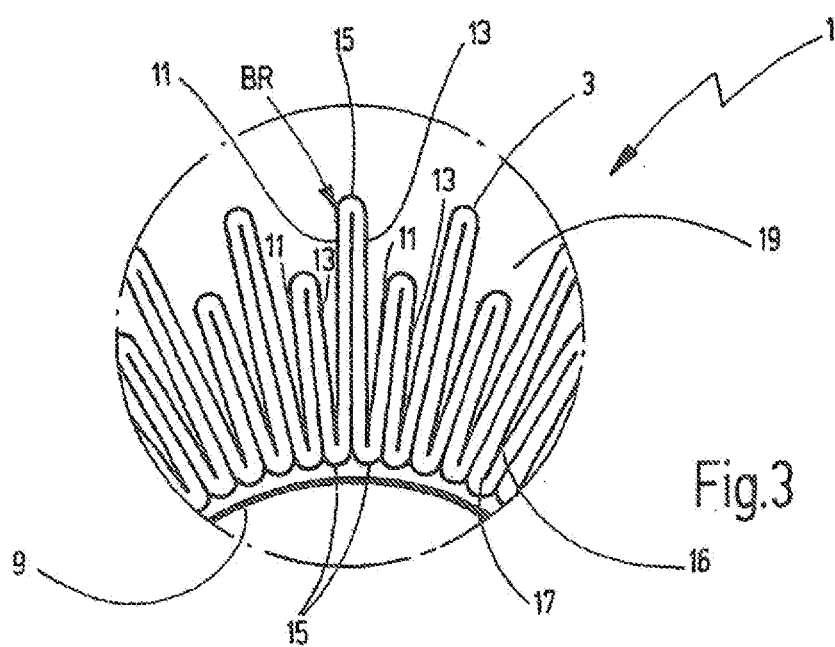
FIG. 3 is an enlarged, partial top view of the circled portion of the filter medium of FIG. 2.

FIGS. 1 and 3 show a filter element 1 according to an exemplary embodiment of the invention having a filter medium 3 with a multi-layer structure. The filter medium 3 includes, in pleated form, filter pleats 5, 7 having different pleat heights h1, h2. Filter pleats 7 of a first pleat height h1 differ from filter pleats 5 by filter pleats 5 having a comparatively lower second pleat height h2. The second pleat height h2 is approximately ⅔ the height h1 of the filter pleats 7. The filter element 1 includes a flow-through direction for a fluid to be cleaned from an outer lying dirty side S to an inner lying clean side R. All of the filter pleats 5, 7 end toward the clean side R along a fictitious circular cylinder 9, which extends through the filter medium 3 coaxially along its longitudinal axis LA.

The filter pleats 7 having the first pleat height h1 and the filter pleats 5 having the second pleat height h2 are situated alternatingly relative to one another. Specifically, the filter pleats 5 having the second pleat height h2 stabilize the alignment and configuration of the filter pleats 7 having the first pleat height h1.

The filter pleats 5 having the second pleat height h2 prevent the filter pleats 7 of the first pleat height h1 from contacting or adhering to one another, because the filter pleats 7 of the first pleat height h1 project toward the dirty side over or beyond the filter pleats 5 having the second pleat height h2 and are spaced apart from one another.

Particularly advantageously, the effective filter surface of the filter medium 3, in spite of the reduction in filter surface area, is the same or even increased, as compared to a filter medium having filter pleats of uniform height comparable to the first pleat height h1. Each filter pleat 5, 7 is formed from two planar filter surfaces 11, 13 lying against one another and are connected to form the pleated filter medium 3. The planar filter surfaces 11, 13 in this case have the same bend radius BR in the area of the transitions 15 to the adjacent filter surface and to the respective adjacent filter pleat 7, 5.

The filter pleats 5, 7 are supported on the clean side R by a support tube 9 forming the fictitious circular cylinder. The support tube 9 is made of metal and includes circular holes distributed on its circumferential surface for the passage of fluid.

The filter pleat 5 having the second pleat height h2, bounded on each side by an adjacent filter pleat 7 having the first pleat height h1 forms a type of M-pleat configuration M, as seen in axial top view of the filter medium 3 and from the clean side R. To obtain slit-like fine filtration regions 16 at the base 17 of the filter medium 3 on the clean side, the individual filter pleats 5, 7 of differing pleat heights h1, h2 split apart conically or at acute angles, while forming the M-pleat configuration M.

Due to the M-pleat configuration M between two adjacent filter pleats 7 of the first pleat height h1, which bound a filter pleat 5 having the second pleat height h2, an open holding space 19 for fluid is formed on the dirty side S in the manner of a fictitious cylindrical segment. During operation of the filter element 1, the open holding space 19 results in a standardization and in a reduction of the flow velocity of the fluid through the filter element 1.

Furthermore, during operation of the filter element, in which the filter element is normally perfused by a fluid contaminated with particles resulting in an electrostatic charging of the filter element 1, particularly advantageously, due to the M-pleat configuration, this charging is reduced as a result of the reduction of the fluid flow velocity induced by the respective holding space 19. In this case, the charging increases with increasing flow velocity and, accordingly decreases when the flow velocity drops. The aim, therefore, is to reduce the flow-through velocity to the point that any remaining charge may be dissipated by grounding the fluid in components of the hydraulic circuit situated downstream.

Thus, the filter element 1 according to the invention, even after a longer service life, exhibits a high filter performance at a low flow-through velocity. The filter element 1 is therefore more cost-effective and more reliable during operation due to the reduced charging of the passing fluid, which charging may lead to undesirable discharges, resulting in the destruction of the element material, in increasing oil ageing and in an increased fire hazard.

In the figures, the clean side R is provided on the inside, and the dirty side S is provided on the outside of the filter medium 3. It is understood that the clean side R may also be situated on the outside and the dirty side on the inside of the filter medium 3.

While one embodiment has been chosen to illustrate the invention, it will be understood by those skilled in the art that various changes and modifications can be made therein without departing from the scope of the invention as defined in the claims.

The invention claimed is:

1. A filter element, comprising:
a tubular and pleated filter medium with a multi-layer structure configured for fluid to be filtered to flow between inner and outer sides of said filter medium;
first pleats in said filter medium having a first pleat height;
second pleats in said filter medium having a second pleat height, said second pleat height being approximately two-thirds of said first pleat height, each said second pleat being bounded by adjacent ones of said first pleats defining an M-pleat configuration as viewed from a top of the filter medium and as viewed from the at least one of said inner side or said outer side;
a support tube supporting said first and second pleats at said inner side;
inner transitions of all of said first and second pleats being adjacent said inner side and being along a circular cylinder extending through said filter medium coaxially to a longitudinal axis of said filter medium, each of said first and second pleats being separated from an adjacent one of said first and second pleats by a tapered space tapering toward a respective one of said inner transitions of said first and second pleats along said circular cylinder extending through said filter medium, said tapered spaces extending along entire radial extents of said first and second pleats, each of said first and second pleats having inner planar surfaces lying directly against one another, said inner planar surfaces of each of said first and second pleats directly contacting one another along entire lengths thereof between said inner transitions and outer transitions between said inner planar surfaces, said inner and outer transitions extending along a same bend radius; and
an open holding space being between each pair of adjacent ones of said first pleats bounding one of said second pleats therebetween and being defined by the respective M-pleat configuration, said open holding space being on said outer side of said filter medium configured for standardizing and reducing flow velocity of fluid through said filter medium during filtering operation;
whereby, during filtering operation, fluid contaminated with particles electrostatically charges said filter medium upon passing through said filter medium and reduced electrostatic charges are a result of the flow velocity of fluid induced by said holding spaces.

2. A filter element according to claim 1 wherein said first and second pleats alternate about a circumference of said filter medium.

3. A filter element according to claim 1 wherein said second pleats are configured to stabilize alignments and configurations of said first pleats.

4. A filter element according to claim 1 wherein said second pleats are configured to prevent said first pleats from at least one of contacting or adhering to one another to an extent said first pleats project toward said outer side of said filter medium over said second pleats.

5. A filter element according to claim 1 wherein said filter medium is configured to have an effective filter surface, despite a reduced surface thereof, at least as great as a pleated filter medium having pleats with a uniform pleat height equal to said first pleat height.

6. A filter element according to claim 1 wherein a clean side is on said inner side of said filter medium, is encompassed by said filter medium and forms the circular cylinder.

7. A filter element according to claim 1 wherein a clean side is on said outer side of said filter medium facing away from the circular cylinder.

8. A filter element according to claim 1 wherein said pleats extend apart from one another at acute angles, while forming said M-pleat configuration, forming slit-shaped fine filtration regions at bases of said filter medium.

* * * * *